May 21, 1946.　　　H. W. OKESON　　　2,400,595
SAW RIG
Original Filed Feb. 23, 1943
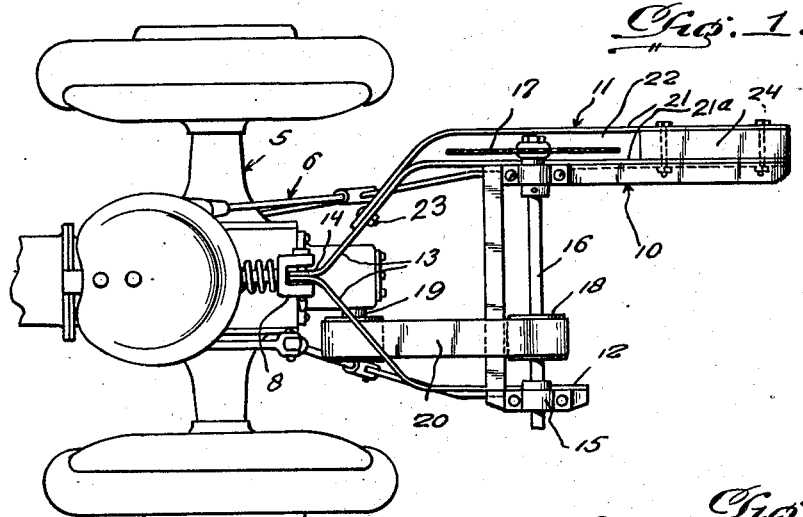
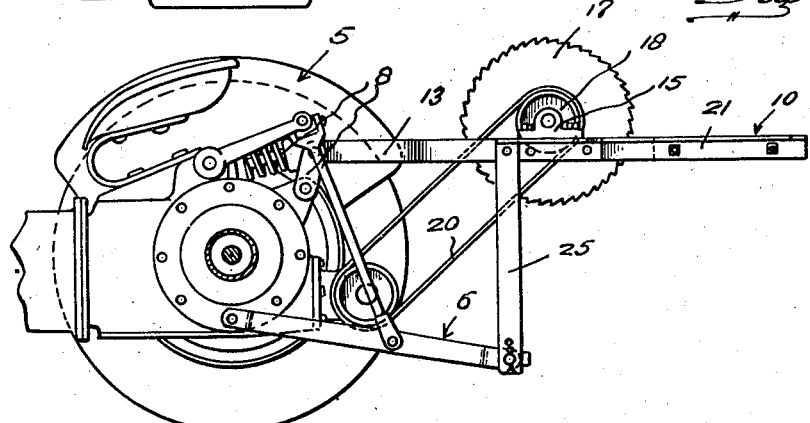
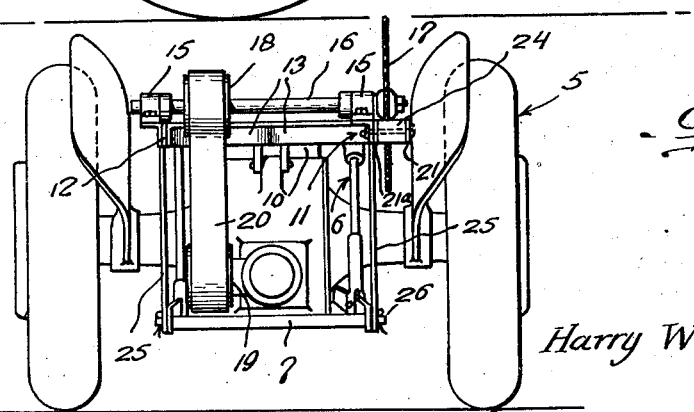
Inventor
Harry W. Okeson,
By McMurro and Berman
Attorneys Patented May 21, 1946

2,400,595

UNITED STATES PATENT OFFICE 2,400,595

SAW RIG

Harry W. Okeson, Detroit Lakes, Minn.

Continuation of application Serial No. 476,823, February 23, 1943. This application March 30, 1945, Serial No. 585,596

1 Claim. (Cl. 143—43)

This application is a continuation of my prior application Serial Number 476,823, filed Feb. 23, 1943, and formally abandoned May 1, 1945.

This invention relates to a saw rig for tractors and is especially adaptable to a tractor having thereon the Ferguson system of hydraulic draft hitch. The primary object of this invention is the provision of a device of the above stated character which is constructed so that its application to the tractor will be through the use of the Ferguson draft hitch and will permit the saw thereof to be driven by power derived from the tractor power takeoff and will not in any way interfere with the use of the stated type of hitch in coupling implements to the tractor and the pulling of said implements by the tractor.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary top plan view illustrating a portion of a tractor equipped with a Ferguson draft hitch and the present invention applied to said tractor through the use of the stated hitch.

Figure 2 is a side elevation, partly in section, showing the invention in operative position on the tractor.

Figure 3 is a rear elevation illustrating the device applied to the tractor.

Referring in detail to the drawing, the numeral 5 indicates a fragmentary portion of a tractor, 6 a Ferguson hydraulic draft hitch installed on said tractor for the coupling and towing of implements by the tractor. It is the purpose of the present invention to form or construct a saw rig which is mountable on the tractor through the employment of the stated type hitch. Further, the construction of the present invention will permit its application or connection with the hitch by being connected or coupled to the draft bar 7 of the hitch and the rocker 8 of the hitch.

When the invention is applied to said parts the coupling of the draft bar to implements can be still carried out and also the rocker 8 may perform its usual function.

In constructing the present invention so that it can be easily installed and removed from the hitch, a frame 10 is provided which consists of parallel side portions 11 and 12 converging, as shown at 13, to provide an attaching part 14 apertured to receive a pin forming a part of the rocker 8. The side portion 12 as well as the side portion 11 have removably mounted thereon aligned journals 15 to rotatably support a saw mandrel 16 to which is removably secured a disc type saw 17.

The mandrel 16 is equipped with a pulley 18 connected to the power takeoff of the tractor or the pulley 19 thereof by a belt 20.

The side portion 11 is composed of parallel spaced members 21 and 21a defining a space 22 in which operates the saw 17. The members 21 and 21a are bent and secured together, as shown at 23. A bed block 24 is secured to the members 21 and 21a and lies therebetween, as shown in Figure 1, for the purpose of supporting work adjacent to the saw.

Supporting legs 25 are secured to the side portions 11 and 12 and are provided with a series of openings, any one of which may be applied to the ends of the draft bar 7 by simply removing the keys 26 of the draft bar.

The present invention constructed and applied to the tractor as specified and shown in the drawing, will permit sawing operations to be conveniently and quickly carried out employing the power of the tractor for the operation of the saw. Also, it will be seen that at any time it is desired to employ the tractor and its hitch for towing implements, said implements can be coupled as usual to the draft bar with the present invention still applied and that the hitch can function as normal. Thus if the tractor is to be employed for towing implements indefinitely and use of the saw is not required, the frame 10 can be easily and quickly removed from the hitch.

While I have shown and described the preferred embodiment of my invention, it will be understood that minor changes in construction, combination and arrangement of parts may be made without departing from the spirit and scope of the invention claimed.

Having thus described my invention, what I claim is:

In combination with a tractor equipped with a Ferguson hydraulic draft hitch located at the rear of said tractor and including a rocker and a draft bar located in a plane below the rocker, a frame including a pair of parallel longitudinally extending frame members having converging portions apertured to receive a pivot pin of the rocker and including a relatively short and a long frame member, depending legs secured to said members and provided with openings to receive ends of the draft bar for adjustably supporting said frame horizontally and in a plane above the draft bar to provide room for the attachment of implements to the draft bar for operation by the tractor, a mandrel journaled on and across the frame members, said long frame member projecting rearwardly beyond the mandrel, a third frame member secured at its front end to the long frame member and extending parallel thereto rearwardly of the mandrel to provide a saw space, a saw secured to one end of the mandrel and positioned in the saw space, a filler block secured between the rear ends of the long frame member and said third frame member to provide a work support offset at one side of the frame and positioned behind the saw, a transverse brace paralleling the mandrel and connecting said pair of frame members, and means for connecting the mandrel to a power takeoff of the tractor.

HARRY W. OKESON.